United States Patent
Schweikert et al.

(10) Patent No.: US 11,293,539 B2
(45) Date of Patent: Apr. 5, 2022

(54) SYSTEM WITH OIL FILLING DEVICE FOR A TRANSMISSION

(71) Applicant: SEW-EURODRIVE GMBH & CO. KG, Bruchsal (DE)

(72) Inventors: Daniel Schweikert, Bruchsal (DE); Philipp Siegel, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 254 days.

(21) Appl. No.: 16/497,171

(22) PCT Filed: Mar. 7, 2018

(86) PCT No.: PCT/EP2018/025058
§ 371 (c)(1),
(2) Date: Sep. 24, 2019

(87) PCT Pub. No.: WO2018/171945
PCT Pub. Date: Sep. 27, 2018

(65) Prior Publication Data
US 2020/0318728 A1    Oct. 8, 2020

(30) Foreign Application Priority Data
Mar. 24, 2017 (DE) .................. 10 2017 002 945.8

(51) Int. Cl.
*F16H 57/04* (2010.01)
(52) U.S. Cl.
CPC ................. *F16H 57/0408* (2013.01)
(58) Field of Classification Search
CPC . F16H 57/0408; F16H 57/04; F01M 11/0458; F01M 11/0408; F01M 11/04; F01M 2011/0491
See application file for complete search history.

(56) References Cited

U.S. PATENT DOCUMENTS

| | | | |
|---|---|---|---|
| 5,014,445 | A | 5/1991 | Martell |
| 5,860,459 | A | 1/1999 | Reed et al. |
| 7,546,693 | B1 | 6/2009 | Impellizeri |
| 2010/0111718 | A1 | 5/2010 | Schultz |

FOREIGN PATENT DOCUMENTS

| | | | | |
|---|---|---|---|---|
| DE | 102006053757 A1 | 5/2008 | | |
| FR | 2486891 A1 | * | 1/1982 | ......... F16H 57/0408 |

OTHER PUBLICATIONS

International Search Report dated Jun. 30, 2018, in International Application No. PCT/EP2018/025058 (English-language translation).
International Preliminary Report on Patentability issued from the International Bureau dated Oct. 3, 2019.

* cited by examiner

*Primary Examiner* — Daniel D Yabut
(74) *Attorney, Agent, or Firm* — Carter, DeLuca & Farrell LLP

(57) ABSTRACT

A system includes an oil filling device for a transmission, the transmission having a recess. The oil filling device includes a slotted bushing which is provided with an axially uninterrupted recess through which a cone unit projects, the cone unit having an external thread onto which a nut is screwed, on the side of the slotted bushing facing away from the transmission. The cone unit includes a region that widens in the direction of the transmission, and/or a cone region which presses the slotted bushing against the transmission, in particular in the axial region covered by the recess.

20 Claims, 3 Drawing Sheets

SYSTEM WITH OIL FILLING DEVICE FOR A TRANSMISSION

FIELD OF THE INVENTION

The present invention relates to a system with an oil filling device for a transmission.

BACKGROUND INFORMATION

Certain conventional transmissions are provided with an oil-filled interior space for the purpose of lubricating toothed components that mesh with one another.

German Patent Document No. 10 2006 053 757 describes a device for filling transmission housings with transmission oil.

U.S. Pat. No. 5,014,445 describes a fill regulator for fluid.

U.S. Pat. No. 5,860,459 describes a method for filling an automatic transmission with a working fluid.

SUMMARY

Example embodiment of the present invention provide a system in which the filling of a transmission with oil may be improved.

According to an example embodiment of the present invention, a system is provided with an oil filling device for a transmission, and the transmission includes a recess. The oil filling device has a slotted bushing, which is provided with an axially uninterrupted recess through which a cone unit projects which includes, on the side of the slotted bushing facing away from the transmission, an external thread onto which a nut is screwed. The cone unit has a region that widens in the direction the transmission and/or a conical region which presses the slotted bushing against the transmission, in particular in the axial region covered by the recess, in particular so that the cone unit is axially displaced as a function of the rotary position of the nut, and the slotted bushing is able to be pressed against the recess by the cone unit. The cone unit includes, for example, a conical bushing and a threaded sleeve, which is firmly connected to the conical bushing or which is provided in one piece.

This has the advantage that the oil filling device is able to be connected in a releasable and nonpositive manner at the recess of the transmission. However, slots of the slotted bushing are provided for an air equalization. It is therefore possible that the oil volume filled into the transmission displaces a corresponding air volume and an air equalization takes place, i.e. no overpressure is generated, which would particularly make the supply of oil more difficult. The slotted bushing is able to be operated by a rotation, i.e. by turning a nut which is in engagement with the external winding of the cone unit. This allows for an uncomplicated operation.

According to example embodiments, the slotted bushing has slots which are set apart from one another in the circumferential direction and cover an axial region that overlaps with the axial region covered by the recess or that encompasses the axial region covered by the recess. The slots may be set apart from one another at regular intervals in the circumferential direction. This has the advantage that an air equalization is able to be carried out. As a result, the air volume displaced by the filled-in oil volume escapes without any particular resistance.

According to example embodiments, the cone unit has an axially uninterrupted recess which leads into the interior space region of the transmission on one side and which is connected to an oil supply orifice on the other side and which is able to be opened and/or closed with the aid of a piston situated so as to be axially displaceable. This is considered advantageous insofar as oil may be supplied to the interior space region of the transmission through the recess. The oil flow is therefore easy to control.

According to example embodiments, a control lever is connected to the nut and/or the nut is accommodated by a keyed connection in a receptacle, where a control lever is fixed in place, in particular a radially oriented control lever. This offers the advantage that an operation is easily accomplished, in particular using little force.

According to example embodiments, the piston is connected to a piston rod, which is axially displaceable, in particular axially displaceable in a linear fashion, and in particular axially displaceable by a back and forth movement. This has the advantage of allowing for an uncomplicated control of the oil flow by moving the piston rod back and forth.

According to example embodiments, the cone unit has a hollow cylinder part into which the piston rod projects and which is sealed from the inner wall of the cylinder part with the aid of threaded sleeves and/or with the aid of a piston seal, in particular, the threaded sleeves are connected to the piston rod by screws, and the piston seal is connected to the threaded sleeves by a keyed connection, in particular clamped between the threaded sleeves. This offers the advantage that the oil filling device is able to be operated in a manner that is controlled by compressed air.

The compressed air, which in particular is generally also referred to as pressurized air, is generated in a system by a compressor and supplied using tubes and/or pipes.

According to example embodiments, the cylinder part is integrally premolded on the cone unit and/or is firmly connected to the threaded sleeve. This is considered advantageous insofar as it allows for an uncomplicated production.

According to example embodiments, the cylinder part has a radially uninterrupted opening, which functions as the oil supply orifice. This offers the advantage that an oil port is situated on the cylinder part and oil may thus be supplied through the cylinder part so that the oil flow is controllable.

According to example embodiments, a seal, in particular an O-ring, is situated on the piston in order to tightly seal the outlet orifice of the cone unit, in particular the conical bushing, from the interior space region of the transmission. This is considered advantageous insofar as tight sealing is possible. Alternatively, tight sealing is also achievable if the conical bushing is pressed flat against the slotted bushing so that a surface of a conical section forms the mutual contact surface. The material pairing of steel on steel may, for example, be used. Sufficient tightness is achievable given a high contact pressure.

According to example embodiments, the cylinder part has a first compressed air inlet axially upstream from the piston seal and a second compressed air inlet axially downstream from the piston seal. The first compressed air inlet, for example, is arranged as a radially uninterrupted recess in the cylinder part, and the second compressed air inlet, for example, is arranged as a radially uninterrupted recess in the cylinder part. This is considered advantageous insofar as an oil filling operation that is controlled through the supply of compressed air may be carried out.

According to example embodiments, the piston rod is linearly guided in a guide bushing which is provided in the axially uninterrupted recess of the cone unit, in particular the conical bushing. The guide bushing includes axially uninterrupted recesses, which in particular are set apart from one another in the circumferential direction, in particular recesses that are set apart from one another at regular intervals in the circumferential direction, the recesses in particular being radially set apart from the piston rod. This is considered advantageous insofar as the piston rod is mounted in a stable manner.

According to example embodiments, the cylinder part is sealed by a locking screw and/or by a closure part in the end region of the cylinder part facing away from the transmission. This has the advantage that interior space regions for the supply of compressed air are provided in the cylinder part and a back-and-forth movement of the piston rod may therefore be executed.

According to example embodiments, a spring part, which is supported on the cylinder part, on the locking screw and/or on the closure part, introduces a spring force into the piston rod and/or exerts pressure on the piston rod. This offers the advantage that in the event of a malfunction of the compressed air, sealing, and thus a termination of the filling operation, is able to be brought about in an automatic manner.

According to example embodiments, a bushing is accommodated in the cylinder part, in particular pressed in, the piston rod projects through the bushing, and a seal, in particular at least one rod seal, is accommodated between the piston rod and the bushing, which in particular seals the piston rod from the bushing. This offers the advantage that the region filled with the compressed air is sealed, i.e. separated, from the oil-filled region.

According to example embodiments, the nut has an annular groove in which a lock washer is accommodated, which is firmly connected to the slotted bushing. The lock washer, for example, functions as a pivot rest for the nut, the nut in particular being axially supported on the lock washer, and in particular exerting pressure on the lock washer. This is considered advantageous insofar as a simple pivot rest is created for the nut, which also acts as a restriction of the axial freedom of movement. The nut is thus axially restricted, rotatable and supportable on the locking washer.

Further features and aspects of example embodiments of the present invention are described in greater detail with reference to the appended Figures.

DETAILED DESCRIPTION

Figure 1:
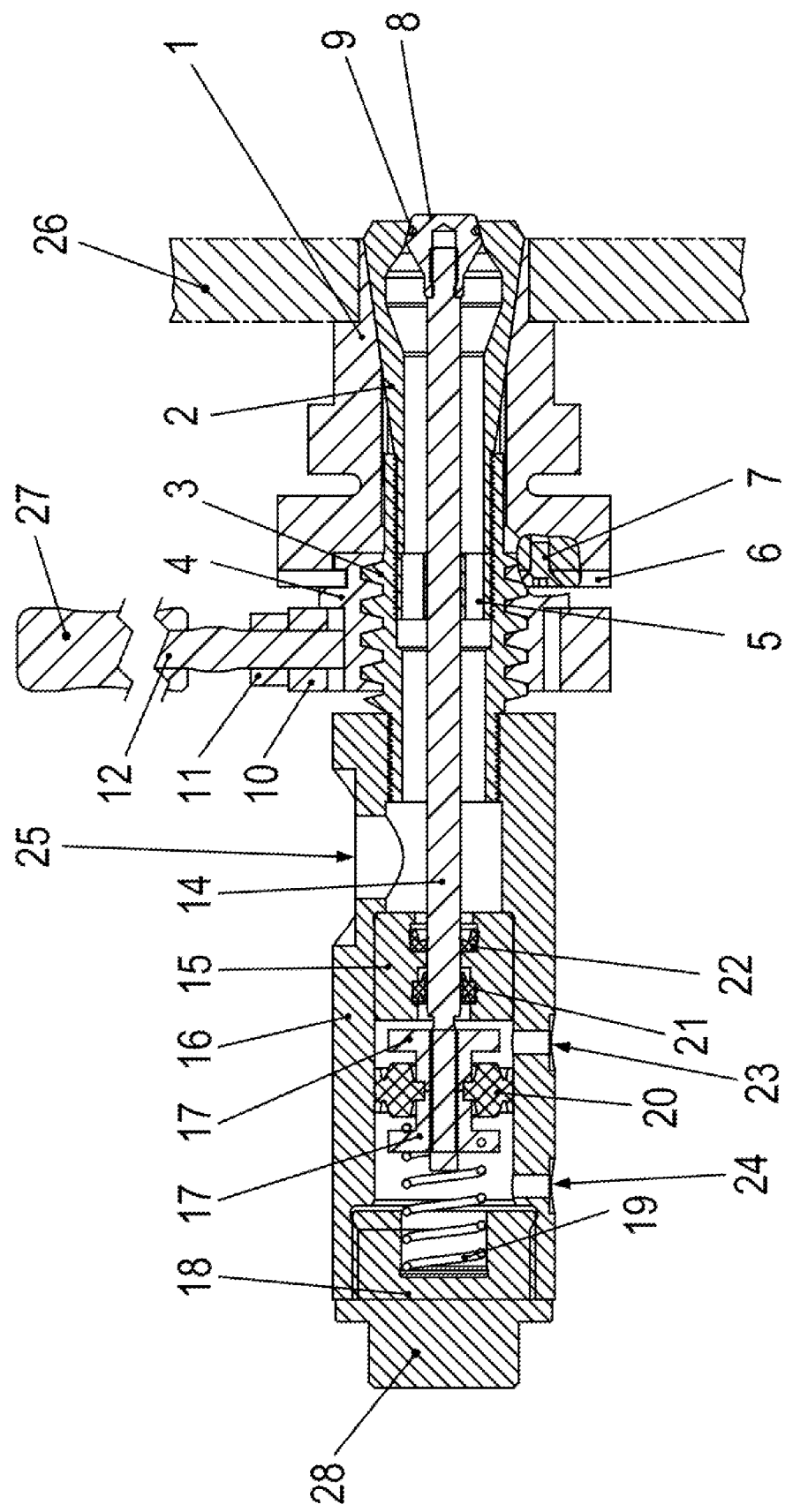
FIG. 1 is a cross-sectional view of an oil filling device for a transmission according to an example embodiment of the present invention.
Figure 2:
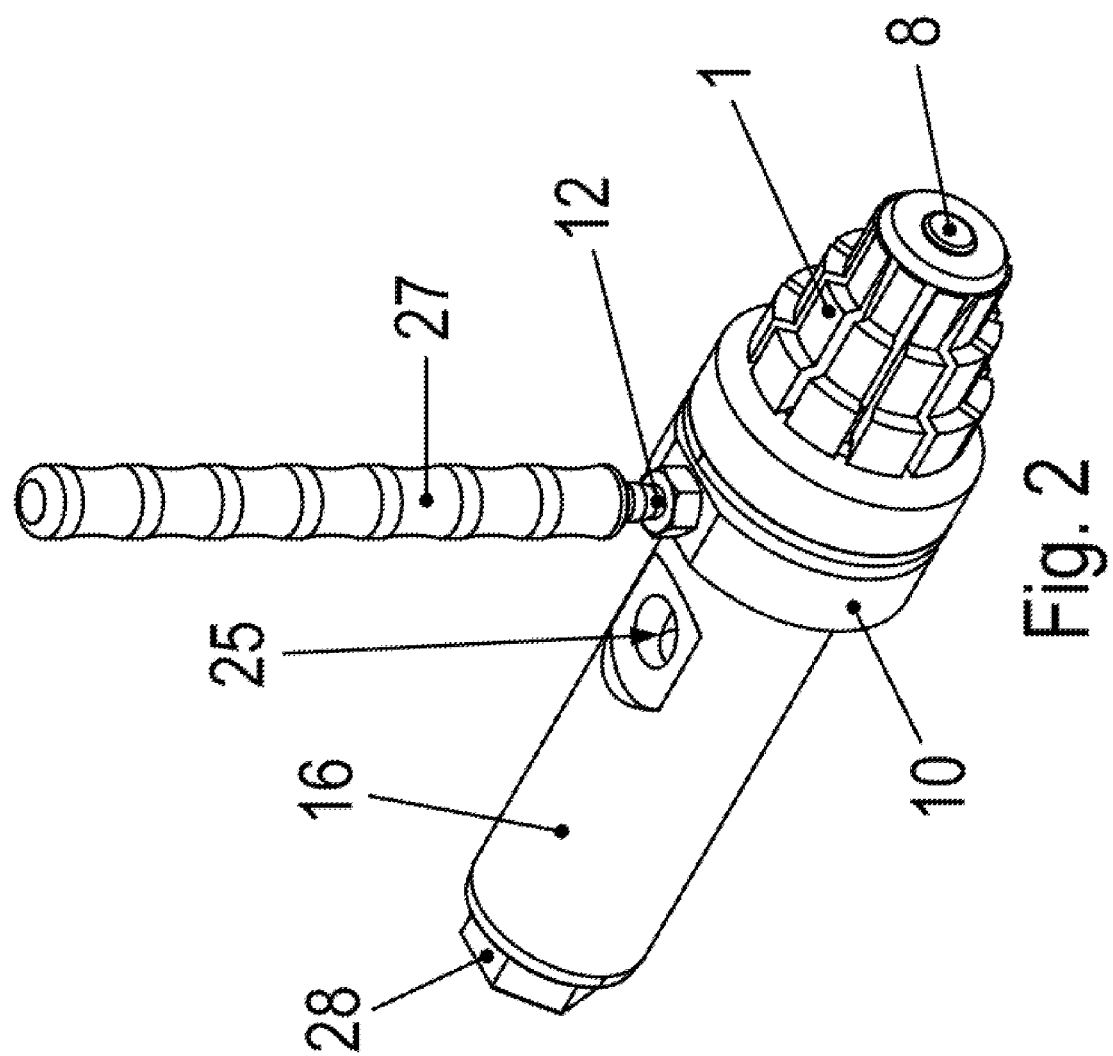
FIG. 2 is a perspective view of the oil filling device from a first viewing direction.
Figure 3:
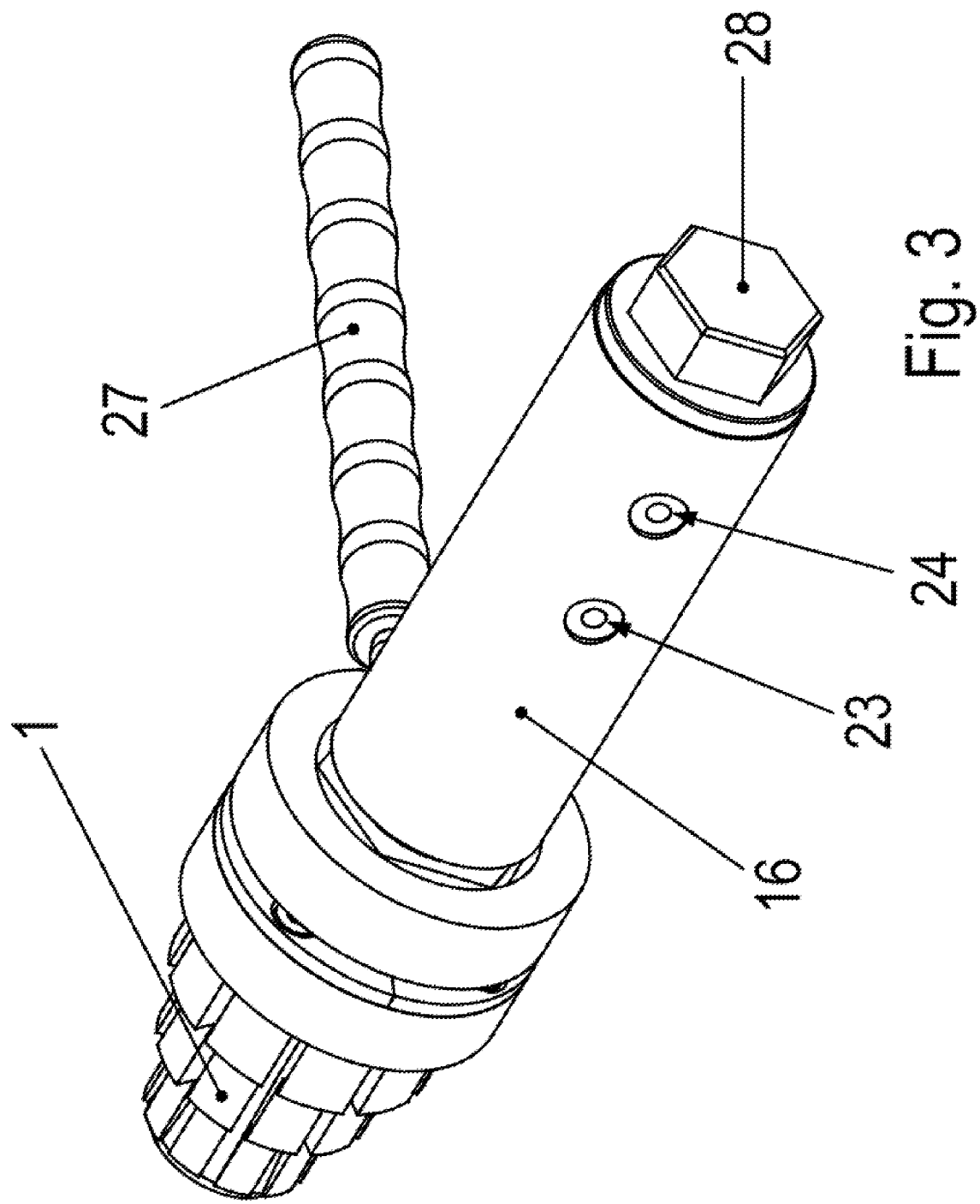
FIG. 3 is another perspective view from a second viewing direction.

As illustrated in the Figures, a transmission which is to be at least partially filled with oil includes a recess to which a slotted bushing 1 is connected in a nonpositive manner by being spread open.

Slotted bushing 1 has at least two cylindrical receiving regions of different diameters for this purpose. The respective receiving region is axially restricted by a step, i.e. a change in diameter. Slotted bushing 1 may thus also be used for recesses in the transmission that have different sizes.

Slots, which are set apart from one another at regular intervals in the circumferential direction and axially penetrate the receiving regions, lead through the recess into the interior space of the transmission, so that ventilation is induced during the filling operation. The exit of air while oil is filled in is possible, in particular.

The radial widening of the receiving regions with respect to the wall of the recess, i.e. with respect to housing part 26, is caused by a conical bushing 2 which is situated radially within slotted bushing 1 and widens in the direction of the interior space of the transmission.

Conical bushing 2 is connected to a threaded sleeve 3, especially in an integral fashion, i.e. bonded and/or connected by screws. Threaded sleeve 3 is connected to a cylinder part 16, in particular in an integral fashion, i.e. bonded or connected by screws. Thus, threaded sleeve 3 is situated axially between conical bushing 2 and cylinder part 16. Although it is connected by screws for production-related purposes, an adhesive agent is introduced into the threaded regions of the screwed connection that are in engagement. As a result, the threaded sleeve together with cylinder part 16 and conical bushing 2 is made up of multiple parts but may be used as a solid component.

As a bushing, slotted bushing 1 has a centrally situated, axially uninterrupted recess into which conical bushing 2 projects or through which conical bushing 2 extends.

Threaded sleeve 3 connected to conical bushing 2 is provided with an external thread, in particular an external thread having a trapezoidal contour.

A nut 4, which is in contact with slotted bushing 1, is screwed onto the external thread.

In order to operate, especially turn nut 4, it is accommodated in a receiving part 10 to which a screw 12 is connected. Screw 12 is screwed into a radially oriented threaded bore of receiving part 10 for this purpose. Screw 12 is secured in the threaded bore with the aid of a further nut 11, in particular a hexagonal nut. To extend and enlarge the torque during an operation, a control lever 27 is connected to screw 12. Nut 4 may therefore be rotated with little force while cylinder part 16 is firmly held in place.

When nut 4 is rotated, conical bushing 2 is therefore axially displaced and thus exerts pressure on the axial end region of slotted bushing 1 facing the transmission, with the result that this region is spread open. Nut 4 has a circumferential annular groove in which a bipartite lock washer 6 is accommodated which is screwed to the slotted bushing. This provides a protection against loss and a pivot rest is achieved for nut 4.

Nut 4 is therefore rotatably situated on lock washer 6 but is axially supported, i.e. also on slotted bushing 1, while conical bushing 2 is axially shifted away from the transmission. Lock washer 6 is screw-fitted to slotted bushing 1 with the aid of a screw 7, which is, for example, arranged as a countersunk screw.

Conical bushing 2 and threaded sleeve 3 are both hollow, i.e. have an axially uninterrupted recess which terminates in the hollow region of cylinder part 16.

Situated on the axial side of cylinder part 16 facing away from the transmission is a closure part 28, which covers the cylinder part in the axial end region.

The recess centrically situated in conical bushing 2 ends in its axial end region in the internal space region of the transmission. However, the outlet orifice of conical bushing 2 is able to be sealed by a piston 8, and a seal 9, in particular an O-ring, is situated on piston 8 in order to increase the tightness.

Piston 8 is connected to a piston rod 14, which is supported via a guide bushing 5, which includes axially uninterrupted recesses that are spaced apart from one another, e.g. at regular intervals, in the circumferential direction and which is supported in the centrally situated, axially uninterrupted recess of conical bushing 2.

An oil supply orifice, in particular an oil port 25, terminates in the cavity of cylinder part 16 so that oil supplied to oil port 25 with the aid of a tube is able to be conveyed through the centrally situated recess in cylinder part 16, in threaded sleeve 3 and in conical bushing 2 to the interior space region of the transmission when piston rod 14 axially pulls piston 8 away from the mouth of conical bushing 2.

A bushing 15 is accommodated, in particular press-fitted, in the recess of cylinder part 16 on the side of the oil supply orifice facing away from the transmission. Piston rod 14 is guided through a recess that is centrally situated in bushing 15 and sealed from bushing 15 by rod seals 21 and 22.

Cylinder part 16 is sealed by cover part 28 together with a locking screw 18. A spring element 19 exerts pressure on piston rod 14 and is supported on locking screw 18, and thus supported on cover part 28 and therefore, indirectly, also on cylinder part 16.

In other words, piston rod 14 is pressed in the direction of the transmission so that piston 8 seals the mouth of the orifice and no oil supply to the transmission is possible.

Piston rod 14 is connected to threaded sleeves 17, which function as a piston entering into an operative connection with cylinder part 16, threaded sleeves 17 being sealed from cylinder part 16 with the aid of a piston seal 20. Threaded sleeves 17 are screwed onto a threaded section of piston rod 14. Piston seal 20 has an annular shape and extends from threaded sleeves 17 to cylinder part 16.

Two radially uninterrupted recesses 23, 24, each being provided as a connection for a separate compressed air hose, are situated on cylinder part 16. Piston seal 20 is situated axially between the two recesses.

The interior space region in cylinder part 16 to which compressed air conveyed through the first of the two recesses 23, 24 may be applied is restricted by bushing 15 together with rod seal 21 as well as cylinder part 16 itself and piston seal 20 together with threaded sleeve 17.

The interior space region in cylinder part 16 to which compressed air conveyed through the second of the two recesses 23, 24 may be applied is restricted by locking screw 18 together with closure part 28 as well as cylinder part 16 itself and by piston seal 20 together with threaded sleeves 17.

Depending on the supply of compressed air through the first or second recess 23, 24, piston seal 20 with threaded sleeves 17 that are connected to it by a keyed connection is axially moved back or forth. Accordingly, the piston rod is moved back and forth by threaded sleeves 17, i.e. piston 8 releases the outlet orifice of the recess of piston rod 14 or keeps it closed.

An oil supply is therefore provided which may be operated using compressed air. If a malfunction occurs in the compressed air, an automatic closing of the outlet orifice is brought about by the spring force generated by spring part 19.

In additional exemplary embodiments, closure part 28 and locking screw 18 are provided as one piece, i.e. are integrally formed.

LIST OF REFERENCE NUMERALS 1 slotted bushing
2 conical bushing
3 threaded sleeve
4 nut, in particular nut including an internal thread
5 guide bushing
6 locking washer
7 screw, in particular countersunk screw
8 piston
9 seal
10 receiving part
11 hexagonal nut
12 screw
14 piston rod
15 bushing
16 cylinder part
17 threaded sleeve
18 locking screw
19 spring part
20 piston seal
21 rod seal
22 rod seal
23 compressed air port
24 compressed air port
25 oil port
26 housing part of the transmission
27 control lever
28 closure part

The invention claimed is:

1. An oil filling device for a transmission having a recess, comprising:
    a cone unit;
    a slotted bushing including an axially uninterrupted recess through which the cone unit projects; and
    a nut screwed onto an external thread of the cone unit, the external thread located on a side of the slotted bushing facing away from the transmission;
    wherein the cone unit includes a region that widens in a direction of the transmission and/or a conical region that presses the slotted bushing against the transmission and/or an axial region covered by the recess of the transmission;
    wherein the cone unit is axially displaceable as a function of a rotary position of the nut, the slotted bushing adapted to press against the recess of the transmission by the cone unit; and
    wherein the cone unit includes a conical bushing and a threaded sleeve firmly connected to the conical bushing or is arranged as one piece.

2. The oil filling device according to claim 1, wherein the slotted bushing includes slots set apart from one another in a circumferential direction and cover an axial region that overlaps with the axial region covered by the recess of the transmission or that encompasses the axial region covered by the recess of the transmission, the slots being set apart from one another at regular intervals in the circumferential direction.

3. The oil filling device according to claim 1, wherein the cone unit includes an axially uninterrupted recess that leads into an interior space region of the transmission on one side, and that is connected to an oil supply orifice on another side, the interior space region being openable and/or closeable with the aid of an axially displaceable piston.

4. The oil filling device according to claim 3, wherein the piston is connected to a piston rod, the piston rod being axially displaceable, axially displaceable in a linear fashion, and/or axially displaceable back and forth.

5. The oil filling device according to claim 4, wherein the cone unit is connected to a hollow cylinder part into which the piston rod projects and which is sealed from an inner wall of the cylinder part with the aid of at least one threaded sleeve and/or with the aid of a piston seal.

6. The oil filling device according to claim 5, wherein the threaded sleeve is screw-connected to the piston rod, and the piston seal is connected to the threaded sleeve by a keyed connection and/or clamped between a plurality of threaded sleeves.

7. The oil filling device according to claim 5, wherein the cylinder part is integrally premolded on the cone unit and/or is firmly connected to the cone unit.

8. The oil filling device according to claim 5, wherein the cylinder part includes a radially uninterrupted opening arranged an oil supply port.

9. The oil filling device according to claim 5, wherein the cylinder part includes a first compressed air inlet axially upstream from the piston rod and a second compressed air inlet axially downstream from the piston seal, the first compressed air inlet arranged as a radially uninterrupted recess in the cylinder part, the second compressed air inlet arranged as a radially uninterrupted recess in the cylinder part.

10. The oil filling device according to claim 5, wherein the cylinder part is sealed by a locking screw and/or by a closure part in an end region of the cylinder part facing away from the transmission.

11. The oil filling device according to claim 10, further comprising a spring part supported on the cylinder part, on the locking screw, and/or on the closure part adapted to introduce a spring force into the piston rod and/or exert pressure on the piston rod.

12. The oil filling device according to claim 5, wherein a bushing is accommodated and/or pressed in the cylinder part, the piston rod projecting through the bushing, and a seal and/or at least one rod seal seals the piston rod from the bushing and is arranged between the piston rod and the bushing.

13. The oil filling device according to claim 4, further comprising a guide bushing arranged and/or screw-fitted in the axially uninterrupted recess of the cone unit, the guide bushing adapted to linearly guide the piston rod, the guide bushing including axially uninterrupted recesses set apart from one another in a circumferential direction, set apart from one another at regular intervals in the circumferential direction, and/or radially set apart from the piston rod.

14. The oil filling device according to claim 3, wherein a seal is provided on the piston and is adapted to tightly seal an outlet orifice of the cone unit and/or the conical bushing from an interior space region of the transmission, and/or the conical bushing includes a cone section area as a contact surface for the slotted bushing.

15. The oil filling device according to claim 14, wherein the seal includes an O-ring.

16. The oil filling device according to claim 3, wherein a seal or an O-ring is provided on the piston and is adapted to tightly seal an outlet orifice of the cone unit and/or the conical bushing from an interior space region of the transmission, and/or the conical bushing includes a cone section area as a contact surface for the slotted bushing.

17. The oil filling device according to claim 1, wherein a control lever is connected to the nut and/or the nut is accommodated by a keyed connection in a receptacle on which the control lever is fixed in place, the control lever being radially oriented.

18. The oil filling device according to claim 1, wherein the nut includes an annular groove in which a bipartite lock washer is accommodated, which is firmly connected to the slotted bushing, the lock washer arranged as a pivot rest for the nut, the nut being axially supported on the lock washer and/or exerting pressure on the lock washer.

19. The oil filling device according to claim 1, wherein a control lever is connected to the nut.

20. The oil filling device according to claim 1, wherein the nut is accommodated by a keyed connection in a receptacle on which a control lever is fixed in place.

* * * * *